US012782768B2

(12) United States Patent
Hsu et al.

(10) Patent No.: US 12,782,768 B2
(45) Date of Patent: Nov. 3, 2026

(54) DISPLAY DEVICE HAVING AN OPTICAL SENSOR BELOW THE DISPLAY REGION TO MITIGATE EXCESSIVELY LARGE SHOOTING ANGLES

(71) Applicant: AUO Corporation, Hsinchu City (TW)

(72) Inventors: Ya-Ling Hsu, Hsinchu City (TW); Jenn-Jia Su, Hsinchu City (TW); Ti-Kuei Yu, Hsinchu City (TW); Yueh-Hung Chung, Hsinchu City (TW); Jia-Hong Wang, Hsinchu City (TW); Wang-Shuo Kao, Hsinchu City (TW); Chia-Jung Wu, Hsinchu City (TW); Yueh-Chi Wu, Hsinchu City (TW); Shang-Wei Hsieh, Hsinchu City (TW); Chao-Wei Yeh, Hsinchu City (TW); Shiang-Lin Lian, Hsinchu City (TW); Chen-Hsien Liao, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 168 days.

(21) Appl. No.: 18/954,482

(22) Filed: Nov. 20, 2024

(65) Prior Publication Data

US 2025/0355293 A1 Nov. 20, 2025

(30) Foreign Application Priority Data

May 16, 2024 (TW) ................................ 113118035

(51) Int. Cl.

| | |
|---|---|
| ***G02F 1/1333*** | (2006.01) |
| ***G02F 1/1335*** | (2006.01) |
| ***G02F 1/13357*** | (2006.01) |

(52) U.S. Cl.

CPC .... *G02F 1/13338* (2013.01); *G02F 1/133512* (2013.01); *G02F 1/133528* (2013.01); *G02F 1/133603* (2013.01)

(58) Field of Classification Search

CPC ........... G02F 1/13338; G02F 1/133512; G02F 1/133528; G02F 1/133603; G02F 1/13312

See application file for complete search history.

(56) References Cited

U.S. PATENT DOCUMENTS

| | | | | |
|---|---|---|---|---|
| 12,082,474 | B2 * | 9/2024 | Ishizuya | H10K 59/38 |
| 12,117,692 | B1 * | 10/2024 | Chen | G02F 1/133605 |

(Continued)

FOREIGN PATENT DOCUMENTS

| | | |
|---|---|---|
| CN | 208384468 | 1/2019 |
| CN | 110034165 | 7/2019 |

(Continued)

*Primary Examiner* — Tracie Y Green

(74) *Attorney, Agent, or Firm* — JCIPRNET

(57) ABSTRACT

A display device including a liquid crystal display (LCD) panel, a backlight module, a light shielding layer, and an optical sensing element is provided. The LCD panel has a first region, a second region, and a third region. The LCD panel includes a liquid crystal layer corresponding to the first region, at least one first self-emitting display element group corresponding to the second region, and at least one second self-emitting display element group corresponding to the third region. The light shielding layer is positioned between the backlight module and a light exit surface of the at least one first self-emitting display element group and corresponds to the second region. The optical sensing element is positioned below the LCD panel and corresponds to the third region.

12 Claims, 11 Drawing Sheets

(56) References Cited

U.S. PATENT DOCUMENTS

| | | | | |
|---|---|---|---|---|
| 2017/0251137 | A1* | 8/2017 | Evans, V | G02F 1/13318 |
| 2022/0404653 | A1* | 12/2022 | Yu | G02F 1/134309 |
| 2023/0038568 | A1* | 2/2023 | Shin | G02B 5/3033 |
| 2025/0370274 | A1* | 12/2025 | Lee | G02B 30/54 |

FOREIGN PATENT DOCUMENTS

| | | |
|---|---|---|
| CN | 110244500 | 9/2019 |
| CN | 110568649 | 12/2019 |
| CN | 111179737 | 5/2020 |

* cited by examiner

DISPLAY DEVICE HAVING AN OPTICAL SENSOR BELOW THE DISPLAY REGION TO MITIGATE EXCESSIVELY LARGE SHOOTING ANGLES

CROSS-REFERENCE TO RELATED APPLICATION

This application claims the priority benefit of Taiwan application serial no. 113118035, filed on May 16, 2024. The entirety of the above-mentioned patent application is hereby incorporated by reference herein and made a part of this specification.

BACKGROUND

Technical Field

The disclosure relates to a display device.

Description of Related Art

A conventional display device, such as a laptop, typically incorporates a front-facing camera positioned within a side frame region. This placement often results in an excessively tilted shooting angle, which may hinder the natural presentation of images.

SUMMARY

The disclosure provides a display device, where an optical sensing element may be positioned below a display region. The display device has a large design margin and mitigates the issue of excessively large shooting angles.

According to an embodiment of the disclosure, a display device including a liquid crystal display (LCD) panel, a backlight module, a light shielding layer, and an optical sensing element is provided. The LCD panel has a first region, a second region, and a third region, and the second region is located between the first region and the third region. The LCD panel includes a liquid crystal layer, at least one first self-emitting display element group, and at least one second self-emitting display element group. The liquid crystal layer is positioned corresponding to the first region. The at least one first self-emitting display element group is positioned corresponding to the second region. The at least one second self-emitting display element group is positioned corresponding to the third region. The backlight module is positioned below the LCD panel and corresponds to the first region and the second region. The light shielding layer is positioned between the backlight module and a light exit surface of the at least one first self-emitting display element group and corresponds to the second region. The optical sensing element is positioned below the LCD panel and corresponds to the third region.

In light of the foregoing, the display device provided in one or more embodiments of the disclosure is equipped with a plurality of micro light emitting diode (LED) pixels in the LCD panel, and the optical sensing element is positioned corresponding to the micro LED pixels. Due to the high aperture ratio of the micro LED pixels, light from the outside of the display device may penetrate the micro LED pixels and enter the optical sensing element. In other words, the optical sensing element may be positioned below the display region of the LCD panel and need not be positioned in a side frame region, thus significantly increasing the design margin of the display device and mitigating the issue of excessively large shooting angles.

To make the above-mentioned features and advantages of the disclosure more apparent and understandable, exemplary embodiments are described below with reference to the accompanying drawings in detail as follows.

DESCRIPTION OF THE EMBODIMENTS

Figure 1A:
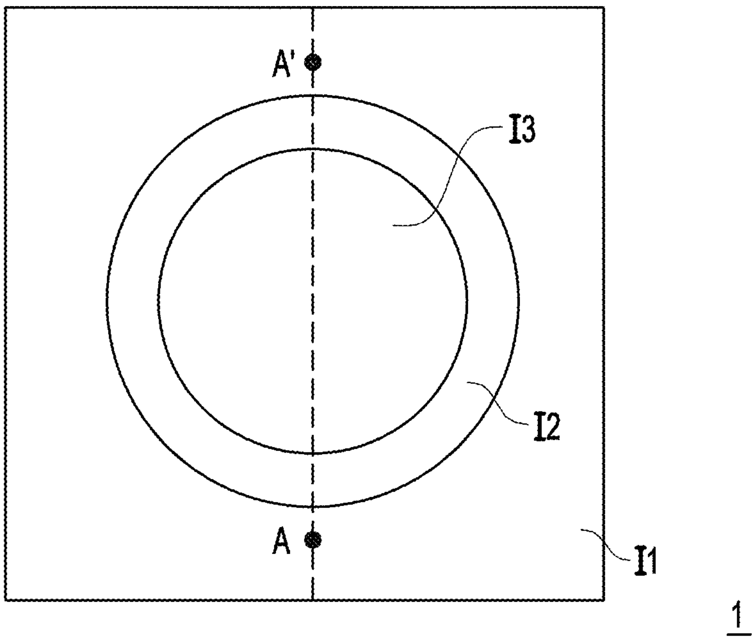
FIG. 1A is a schematic partial diagram of a display device according to a first embodiment and a second embodiment of the disclosure.
Figure 1B:
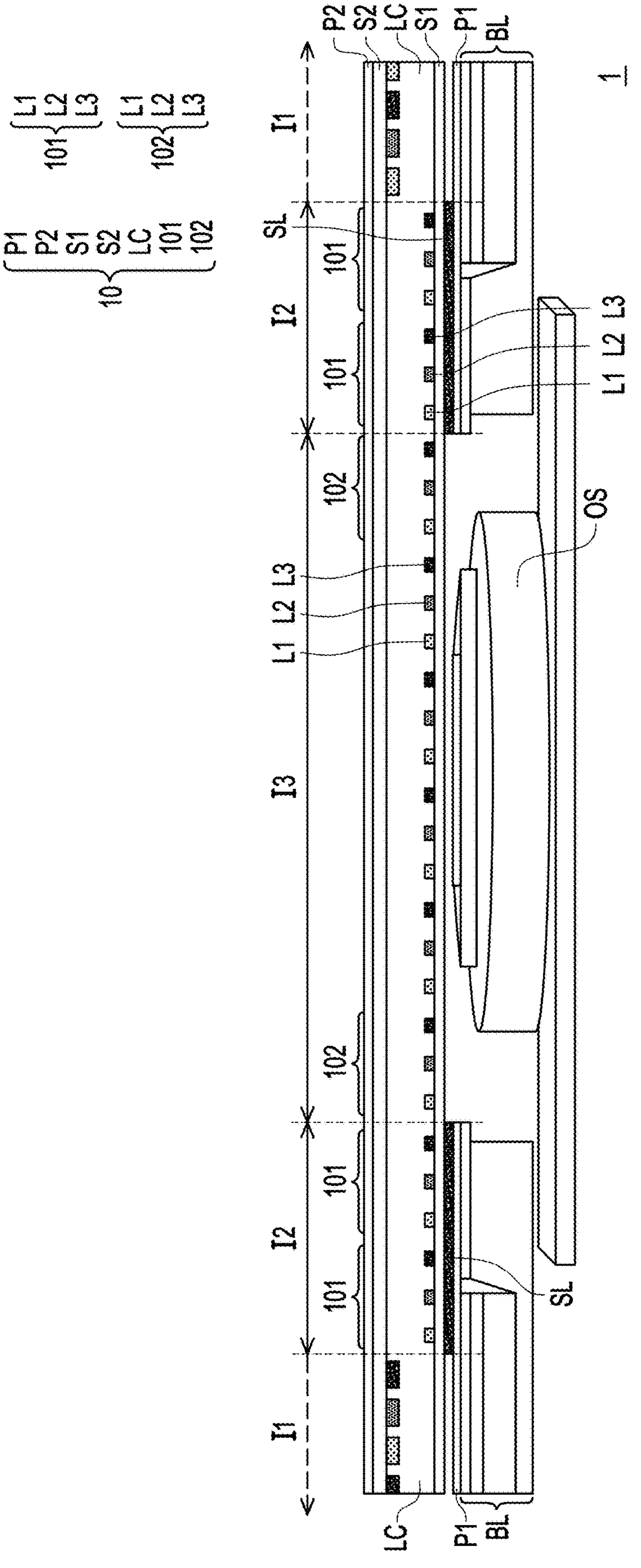
FIG. 1B is a schematic cross-sectional diagram corresponding to FIG. 1A in the first embodiment.

With reference to FIG. 1A and FIG. 1B, FIG. 1A is a schematic partial diagram of a display device according to a first embodiment of the disclosure, and FIG. 1B is a schematic cross-sectional diagram corresponding to FIG. 1A in the first embodiment. For instance, FIG. 1B may be considered as a schematic cross-sectional diagram along a line segment AA' in FIG. 1A.

In this first embodiment, a display device 1 includes an LCD panel 10, a backlight module BL, a light shielding layer SL, and an optical sensing element OS. The LCD panel 10 has a first region I1, a second region I2, and a third region I3. The line segment AA' is a straight line, and the first region I1, the second region I2, the third region I3, the second region I2, and the first region I1 are sequentially arranged on the straight line. As shown in FIG. 1A, the second region I2 and the third region I3 are located within the first region I1 and are surrounded by the first region I1.

The LCD panel 10 includes a lower substrate S1, an upper substrate S2, a lower polarizer P1, an upper polarizer P2, a liquid crystal layer LC, a plurality of micro LED pixels 101 (i.e., a plurality of first self-emitting display element groups), and a plurality of micro LED pixels 102 (i.e., a plurality of second self-emitting display element groups). The liquid crystal layer LC is positioned corresponding to the first region I1. The micro LED pixels 101 are positioned corresponding to the second region I2, where each micro LED pixel 101 includes a red micro LED L1, a green micro LED L2, and a blue micro LED L3. The micro LED pixels 102 are positioned corresponding to the third region I3, where each micro LED pixel 102 includes a red micro LED L1, a green micro LED L2, and a blue micro LED L3. Therefore, the LCD panel 10 may display images through the first region I1, the second region I2, and the third region I3. In this embodiment, the micro LEDs of each micro LED pixel 101 and the micro LEDs of each micro LED pixel 102 are all positioned on a surface of the lower substrate S1 facing the upper substrate S2; however, this should not be construed as a limitation in the disclosure. In some embodiments, the micro LEDs of the micro LED pixels 101 and the micro LEDs of the micro LED pixels 102 may be positioned on a surface of the upper substrate S2 facing the lower substrate S1.

The optical sensing element OS may be, for instance, a camera lens. Considering the high aperture ratio characteristics of the micro LED pixels 102, the optical sensing element OS may be positioned corresponding to the third region I3 of the LCD panel 10, as the high aperture ratio of the third region I3 allows light from the outside of the display device 1 to enter the optical sensing element OS after penetrating the third region I3. In other words, the optical sensing element OS may be positioned below a display region of the LCD panel 10. Unlike conventional display devices, the display device 1 need not equip the optical sensing element OS in a side frame region, which greatly increases the design margin of the display device 1 and mitigates the issue of excessively large shooting angles.

In an embodiment, the micro LED pixels 102 are positioned on a circuit board, and a transmittance of the circuit board is greater than 20%.

It should also be noted that the backlight module BL is positioned below the LCD panel 10 and corresponds to the first region I1 and the second region I2, so as to serve as a light source of the LCD panel 10 in the first region I1. Moreover, to prevent light emitted from the backlight module BL from interfering with the display performance of the micro LED pixels 101 and the micro LED pixels 102, a light shielding layer SL that is opaque is positioned corresponding to the second region I2, and the light shielding layer SL is located between the backlight module BL and a light exit surface of the micro LED pixels 101. Accordingly, the LCD panel 10 may ensure good display quality in the first region I1, the second region I2, and the third region I3. In this embodiment, the light shielding layer SL is located on a surface of the lower substrate S1 facing the backlight module BL and corresponding to the second region I2; however, this should not be construed as a limitation in the disclosure.

In order to fully explain various implementation aspects provided in the disclosure, other embodiments of the disclosure are described below. Note that the reference numbers and part of the content provided in following embodiments are derived from those provided in the previous embodiments, where the same reference numbers serve to represent the same or similar elements, and explanations of identical technical content are omitted. The explanations of the omitted parts may be found in the previous embodiments and will not be repeatedly provided in the following embodiment.

Figure 1C:
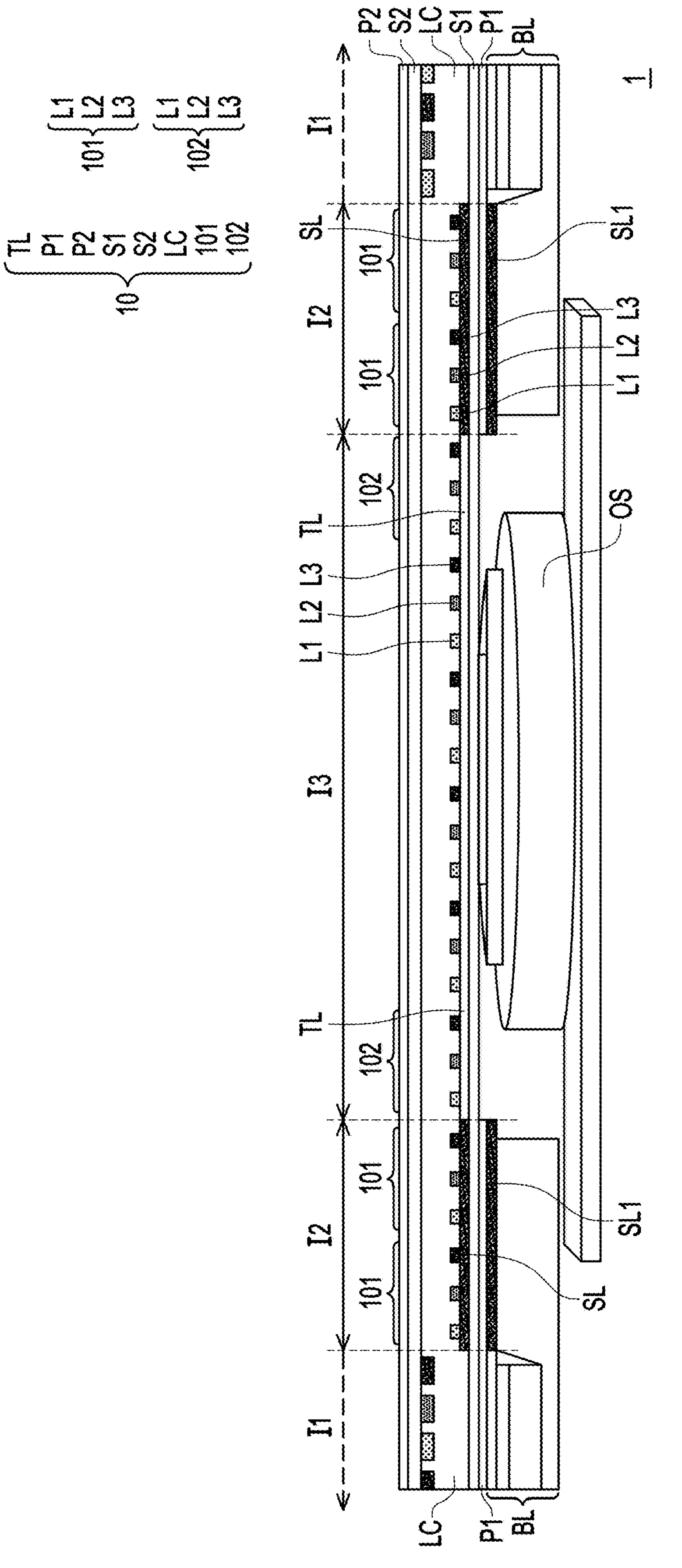
FIG. 1C is a schematic cross-sectional diagram corresponding to FIG. 1A in the second embodiment.

With reference to FIG. 1A and FIG. 1C, FIG. 1A is a schematic partial diagram of a display device according to a second embodiment of the disclosure, and FIG. 1C is a schematic cross-sectional diagram corresponding to FIG. 1A in the second embodiment. For instance, FIG. 1C may be considered as a schematic cross-sectional diagram along the line segment AA' in FIG. 1A.

In this second embodiment, the display device 1 includes the LCD panel 10, the backlight module BL, the light shielding layer SL, and the optical sensing element OS. The LCD panel 10 has the first region I1, the second region I2, and the third region I3. The line segment AA' is a straight line, and the first region I1, the second region I2, the third region I3, the second region I2, and the first region I1 are sequentially arranged on the straight line.

The LCD panel 10 includes the lower substrate S1, the upper substrate S2, the lower polarizer P1, the upper polarizer P2, a transparent layer TL, the liquid crystal layer LC, the LED pixels 101, and the micro LED pixels 102. The liquid crystal layer LC is positioned corresponding to the first region I1. The micro LED pixels 101 are positioned corresponding to the second region I2. The micro LED pixels 102 are positioned corresponding to the third region I3. Therefore, the LCD panel 10 may display images through the first region I1, the second region I2, and the third region I3.

Considering the characteristics of high aperture ratio of the micro LED pixels 102, the optical sensing element OS may be positioned corresponding to the third region I3 of the LCD panel 10, a as the high aperture ratio of the third region I3 allows light from the outside of the display device 1 to enter the optical sensing element OS after penetrating the third region I3.

The backlight module BL is positioned below the LCD panel 10 and corresponds to the first region I1 and the second region I2, so as to serve as a light source of the LCD panel 10 in the first region I1. Moreover, to prevent light emitted from the backlight module BL from interfering with the display performance of the micro LED pixels 101 and the micro LED pixels 102, the light shielding layer SL is positioned on the surface of the lower substrate S1 facing the upper substrate S2 and corresponding to the second region I2. In some embodiments, the light shielding layer SL in the second region I2 may be a light shielding insulating layer or a light shielding metal layer positioned between the lower substrate S1 and a plurality of electrode pads connected to the micro LEDs L1, L2, and L3 and positioned on the lower substrate S1. In some embodiments, a base layer and the electrode pads connected to the micro LEDs L1, L2, and L3 are positioned on the lower substrate S1, and the light shielding layer SL is a laminated light shielding adhesive layer or an ink layer coated on the base layer, and the electrode pads exposed from the ink layer and the laminated light shielding adhesive layer.

In some embodiments, the display device 1 further includes a light shielding layer SL1 corresponding to the second region I2, the light shielding layer SL1 is positioned between the backlight module BL and the LCD panel 10, and the lower polarizer P1 of the LCD panel 10 is positioned between the light shielding layer SL1 and the lower substrate S1 of the LCD panel 10. In some embodiments, the display device 1 includes the light shielding layer SL1, but the LCD panel 10 does not include the light shielding layer SL.

Figure 2A:
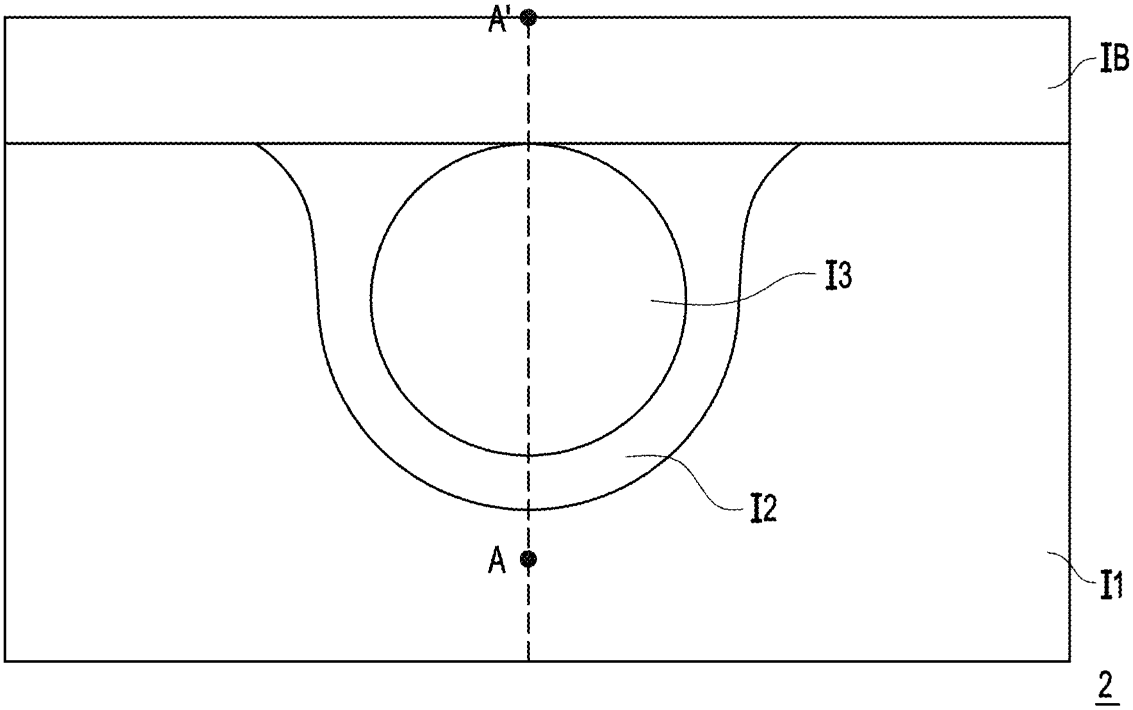
FIG. 2A and FIG. 2C are schematic partial diagrams of a display device according to a third embodiment of the disclosure.
Figure 2B:
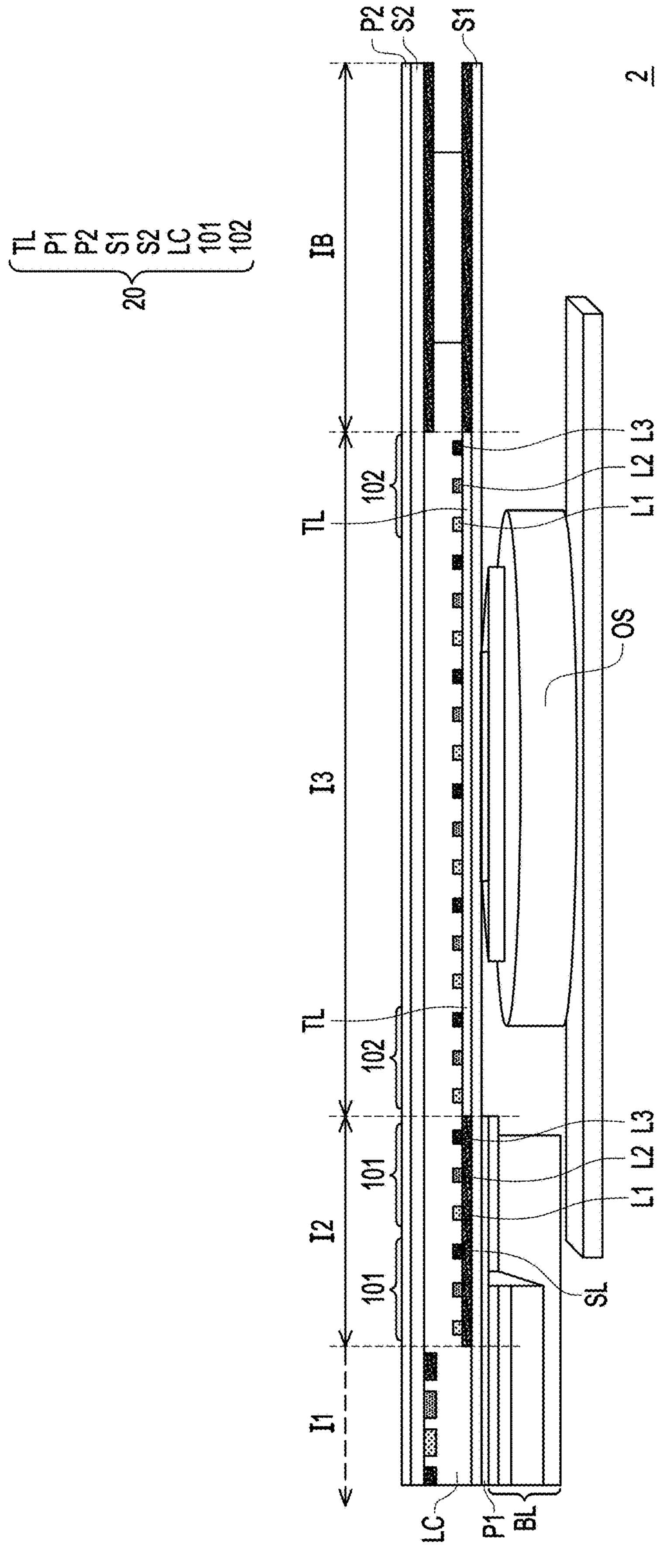
FIG. 2B is a schematic cross-sectional diagram corresponding to FIG. 2A in the third embodiment.

With reference to FIG. 2A and FIG. 2B, FIG. 2A is a schematic partial diagram of a display device according to a third embodiment of the disclosure, and FIG. 2B is a schematic cross-sectional diagram corresponding to FIG. 2A in the third embodiment. For instance, FIG. 2B may be considered as a schematic cross-sectional diagram along a line segment AA' in FIG. 2A.

In this third embodiment, a display device 2 includes an LCD panel 20, the backlight module BL, the light shielding layer SL, and the optical sensing element OS. The LCD panel 20 has the first region I1, the second region I2, the third region I3, and an opaque region IB.

The LCD panel 20 includes the lower substrate S1, the upper substrate S2, the lower polarizer P1, the upper polarizer P2, the transparent layer TL, the liquid crystal layer LC, the micro LED pixels 101, and the micro LED pixels 102. The liquid crystal layer LC is positioned corresponding to the first region I1. The micro LED pixels 101 are positioned corresponding to the second region I2. The micro LED pixels 102 are positioned corresponding to the third region I3. The LCD panel 20 may display images through the first region I1, the second region I2, and the third region I3.

To prevent light emitted from the backlight module BL from interfering with the display performance of the micro LED pixels 101 and the micro LED pixels 102, the shielding layer SL is positioned corresponding to the second region I2. In this embodiment, the light shielding layer SL is positioned on the surface of the lower substrate S1 facing the upper substrate S2 and corresponding to the second region I2; however, this should not be construed as a limitation in the disclosure. In an embodiment not shown in the drawings, the light shielding layer SL may be positioned on the surface of the lower substrate S1 facing the backlight module BL and corresponding to the second region I2.

Figure 2C:
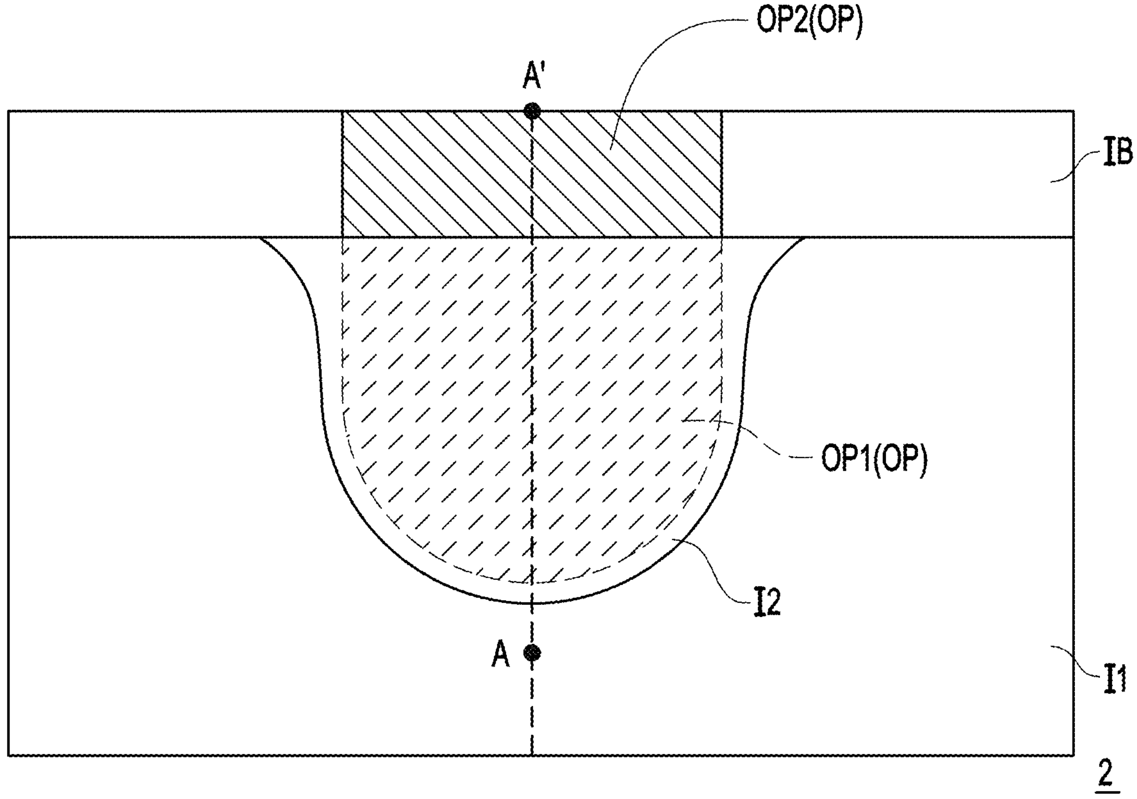
Figure 2D:
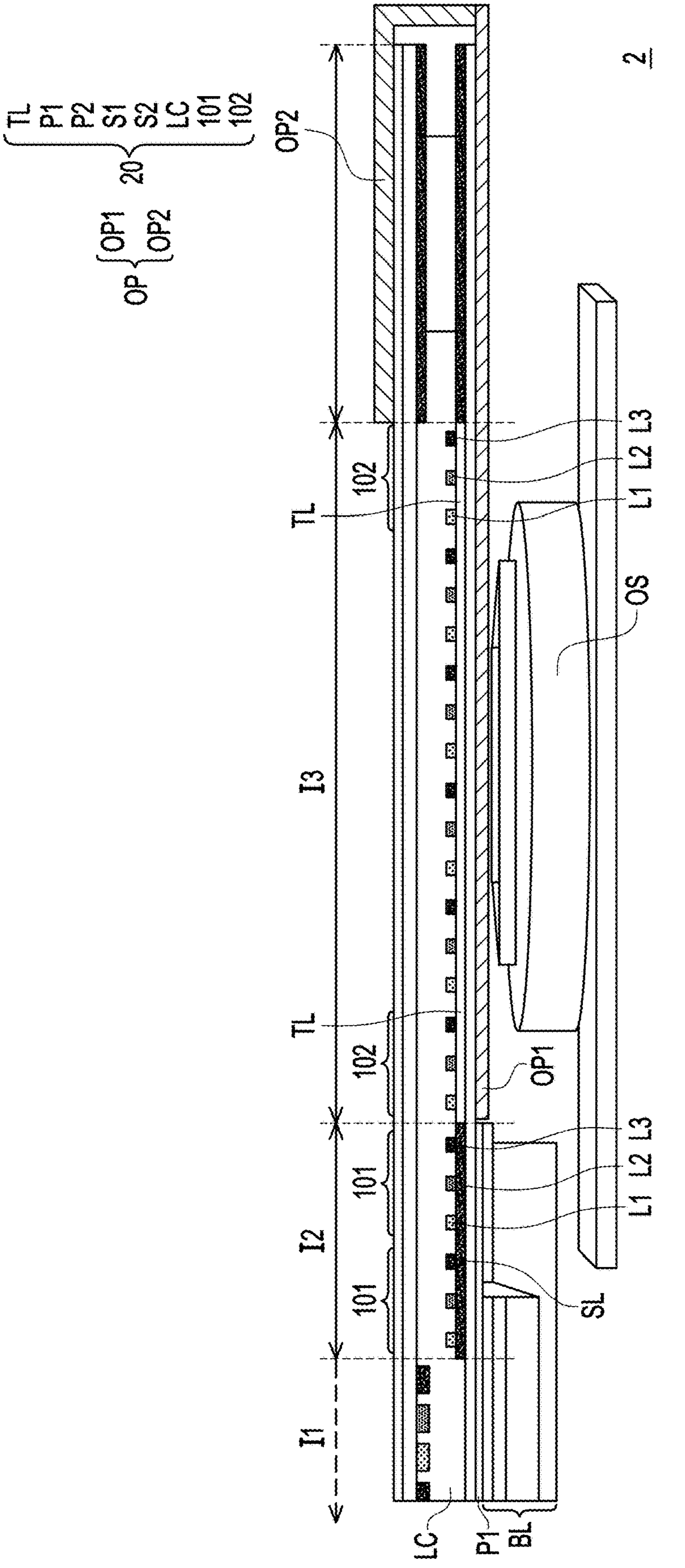
FIG. 2D is a schematic cross-sectional diagram corresponding to FIG. 2C in the third embodiment.

Considering the high aperture ratio characteristics of the micro LED pixels 102, the optical sensing element OS may be positioned corresponding to the third region I3 of the LCD panel 20. The opaque region IB adjacent to the third region I3 is located between the side of the LCD panel 20 and the third region I3. Therefore, with reference to FIG. 2C and FIG. 2D (FIG. 2D may be considered as a schematic cross-sectional diagram along the line segment AA' in FIG. 2C), the display device 2 may further include an opaque shielding member OP, where the shielding member OP includes a main body portion OP1 and a sliding portion OP2 integrally formed with the main body portion OP1. When the sliding portion OP2 is being pushed, the main body portion OP1 may be positioned between the lower substrate S1 of the LCD panel 20 and the optical sensing element OS, thus prevent light from entering the optical sensing element OS and achieving a selective shielding function.

Figure 3A:
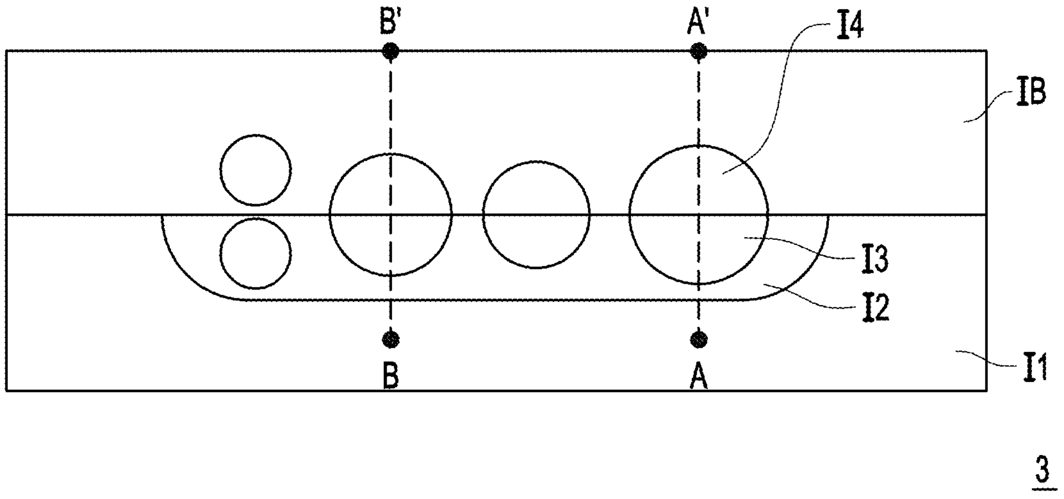
FIG. 3A and FIG. 3C are schematic partial diagrams of a display device according to a fourth embodiment of the disclosure.
Figure 3B:
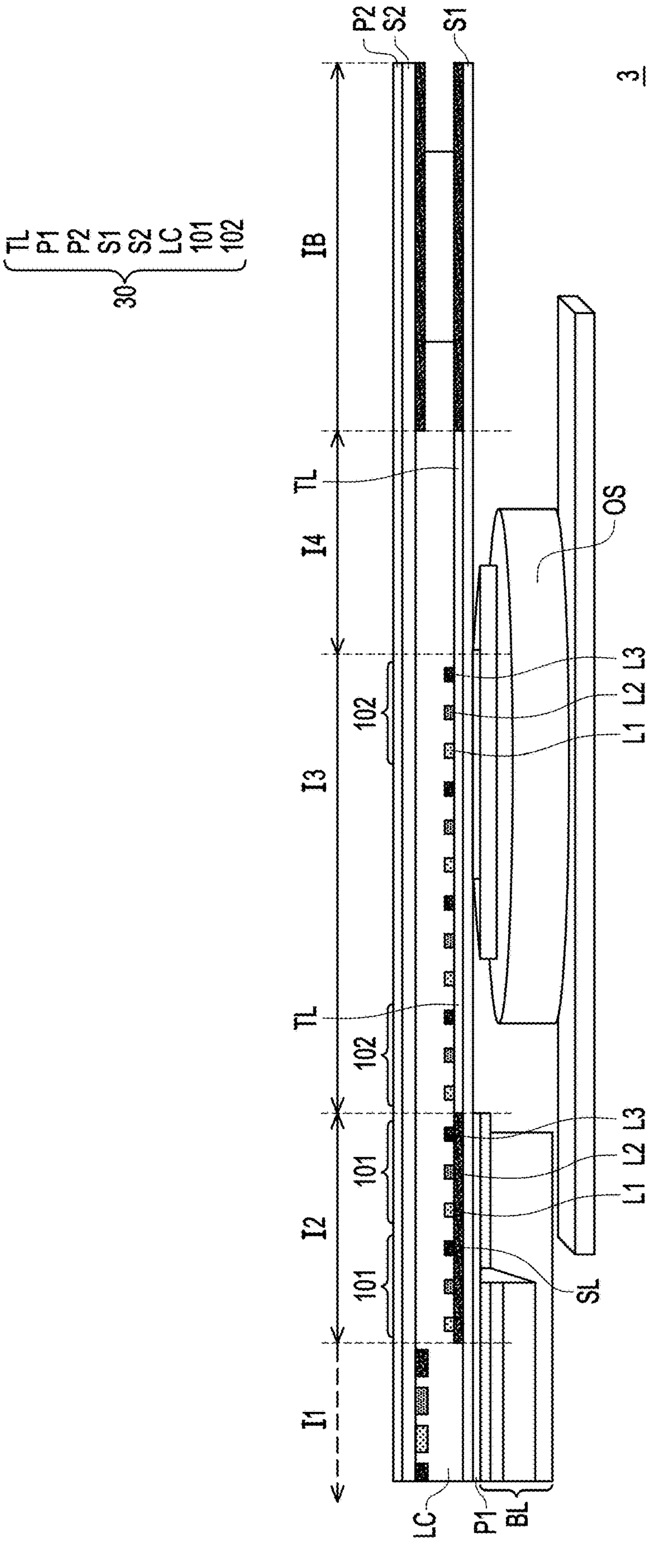
FIG. 3B is a schematic cross-sectional diagram corresponding to FIG. 3A in the fourth embodiment.

With reference to FIG. 3A and FIG. 3B, FIG. 3A is a schematic partial diagram of a display device according to a fourth embodiment of the disclosure, and FIG. 3B is a schematic cross-sectional diagram corresponding to FIG. 3A in the fourth embodiment. For instance, FIG. 3B may be considered as a schematic cross-sectional diagram along a line segment AA' in FIG. 3A.

In this fourth embodiment, the display device 3 includes an LCD panel 30, a backlight module BL, a light shielding layer SL, and an optical sensing element OS. The LCD panel 30 has a first region I1, a second region I2, a third region I3, a fourth region I4, and an opaque region IB. Moreover, the first region I1, the second region I2, the third region I3, the fourth region I4, and the opaque region IB are sequentially positioned along the line segment AA'.

An LCD panel 30 includes the lower substrate S1, the upper substrate S2, the lower polarizer P1, the upper polarizer P2, the transparent layer TL, the liquid crystal layer LC, the micro LED pixels 101, and the micro LED pixels 102. The liquid crystal layer LC is positioned corresponding to the first region I1. The micro LED pixels 101 are positioned corresponding to the second region I2. The micro LED pixels 102 are positioned corresponding to the third region I3. The fourth region I4 is not equipped with any light emitting element. Therefore, the LCD panel 30 may display images through the first region I1, the second region I2, and the third region I3.

To prevent light emitted from the backlight module BL from interfering with the display performance of the micro LED pixels 101 and the micro LED pixels 102, the light shielding layer SL is positioned corresponding to the second region I2. In this embodiment, the light shielding layer SL is positioned on the surface of the lower substrate S1 facing the upper substrate S2 and corresponding to the second region I2; however, this should not be construed as a limitation in the disclosure. In an embodiment not shown in the drawings, the light shielding layer SL may be located on the surface of the lower substrate S1 facing the backlight module BL and corresponding to the second region I2.

Considering the characteristics of high aperture ratio of the micro LED pixels 102, the optical sensing element OS may be positioned corresponding to the third region I3 of the LCD panel 30. In addition, the optical sensing element OS is further positioned corresponding to the fourth region I4 which is not equipped with any light emitting element. Accordingly, light from the outside of the display device 3 may enter the optical sensing element OS after penetrating the third region I3 or the fourth region I4. It should be noted that a width of the fourth region I4 on the line segment AA' is greater than a width of one single micro LED pixel 102, as shown in FIG. 3B, so as to enhance the intensity of light entering the optical sensing element OS.

Figure 3C:
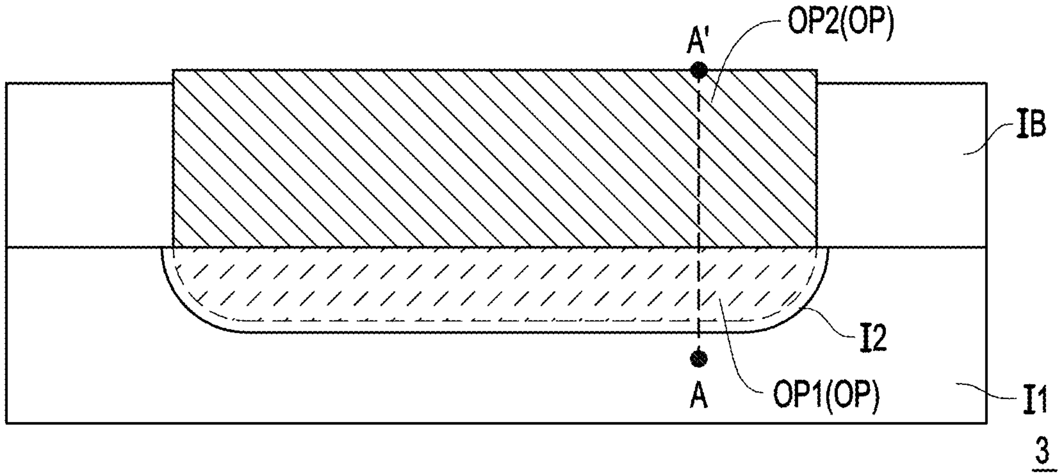
Figure 3D:
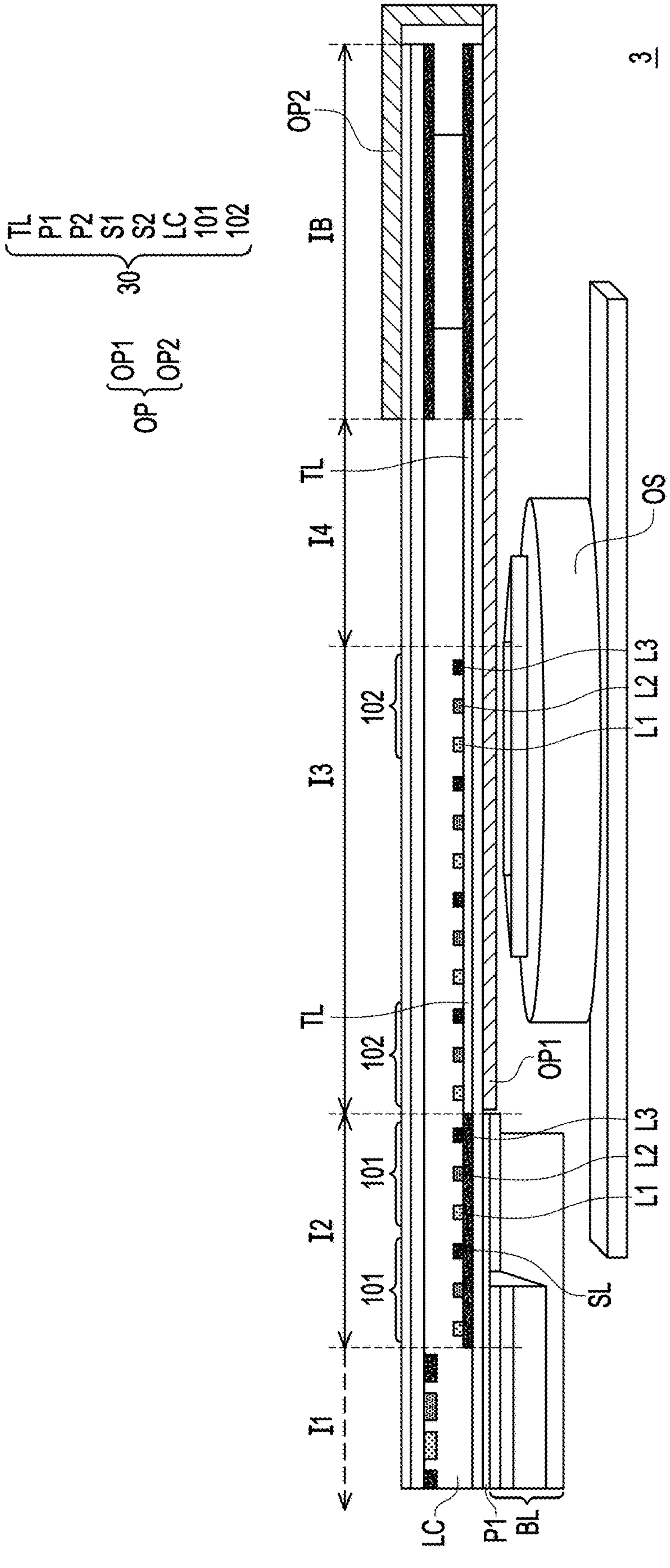
FIG. 3D is a schematic cross-sectional diagram corresponding to FIG. 3C in the fourth embodiment.

The opaque region IB adjacent to the fourth region I4 is located between the side of the LCD panel 30 and the fourth region I4. Therefore, with reference to FIG. 3C and FIG. 3D (FIG. 3D may be considered as a schematic cross-sectional diagram along the line segment AA' in FIG. 3C), the display device 3 may further include the shielding member OP, where the shielding member OP includes the main body portion OP1 and the sliding portion OP2 integrally formed with the main body portion OP1. When the sliding portion OP2 is being pushed, the main body portion OP1 may be positioned between the lower substrate S1 of the LCD panel 30 and the optical sensing element OS, thus preventing light from entering the optical sensing element OS and achieving the selective shielding function.

The display device 3 provided in the fourth embodiment may further include a flash (not shown). In a schematic cross-sectional diagram having a configuration as shown in FIG. 3B, the flash may be configured at the position where the optical sensing element OS is located (i.e., replacing the optical sensing element OS in FIG. 3B), and the schematic cross-sectional diagram corresponds to a line segment BB' in FIG. 3A.

To sum up, the display device provided in one or more embodiments of this disclosure is equipped with the micro LED pixels in the LCD panel, and the optical sensing element is positioned corresponding to these micro LED pixels. Due to the high aperture ratio of the micro LED pixels, light from the outside of the display device may penetrate the micro LED pixels and enter the optical sensing element. In other words, the optical sensing element may be positioned below the display region of the LCD panel and need not be positioned in the side frame region, thus significantly increasing the design margin of the display device and mitigating the issue of excessively large shooting angles.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a liquid crystal display panel, having a first region, a second region, and a third region, the second region being located between the first region and the third region, the liquid crystal display panel comprising:

a liquid crystal layer, positioned corresponding to the first region;

at least one first self-emitting display element group, positioned corresponding to the second region; and at least one second self-emitting display element group, positioned corresponding to the third region;

a backlight module, positioned below the liquid crystal display panel and corresponding to the first region and the second region;

a light shielding layer, positioned between the backlight module and a light exit surface of the at least one first self-emitting display element group and corresponding to the second region; and an optical sensing element, positioned below the liquid crystal display panel and corresponding to the third region.

2. The display device according to claim 1, wherein the first region, the second region, the third region, the second region, and the first region are sequentially arranged along a straight line.

3. The display device according to claim 1, wherein the light shielding layer is located between a lower substrate of the liquid crystal display panel and the backlight module.

4. The display device according to claim 1, wherein the light shielding layer is located on a surface of a lower substrate of the liquid crystal display panel facing an upper substrate of the liquid crystal display panel.

5. The display device according to claim 1, further comprising a shielding member, the liquid crystal display panel further having an opaque region, wherein the opaque region is located between a side of the liquid crystal display panel and the third region, and the shielding member is adapted to be positioned corresponding to the third region and the opaque region.

6. The display device according to claim 1, wherein the liquid crystal display panel further comprises a fourth region, the third region is located between the second region and the fourth region, no light emitting element is positioned in the fourth region, and the optical sensing element is positioned below the liquid crystal display panel and corresponds to the third region and the fourth region.

7. The display device according to claim 6, wherein a width of the fourth region is greater than a width of one of the at least one second self-emitting display element group.

8. The display device according to claim 1, wherein the at least one second self-emitting display element group is positioned on a circuit board, and a transmittance of the circuit board is greater than 20%.

9. The display device according to claim 1, wherein the optical sensing element is an image capturing element.

10. The display device according to claim 1, wherein in the second region, the at least one first self-emitting display element group comprises a plurality of micro light emitting diodes, a base layer and a plurality of electrode pads are positioned on a lower substrate of the liquid crystal display panel, the electrode pads are connected to the micro light emitting diodes, and the light shielding layer is a laminated light shielding adhesive layer or an ink layer coated on the base layer.

11. The display device according to claim 1, wherein in the second region, the at least one first self-emitting display element group comprises a plurality of micro light emitting diodes, the light shielding layer and a plurality of electrode pads are positioned on a lower substrate of the liquid crystal display panel, the light shielding layer is located between the electrode pads and the lower substrate, the electrode pads are connected to the micro light emitting diodes, and the light shielding layer is a light shielding insulating layer or a light shielding metal layer.

12. The display device according to claim 1, wherein a lower polarizer of the liquid crystal display panel is located between the light shielding layer and a lower substrate of the liquid crystal display panel.

* * * * *